PROCESSES FOR PREPARING BIS(HYDROXYNEO-PENTYLIDENE)

Gerald J. Mantell and Francis R. Galiano, Kansas City, Mo., and David Rankin, Kansas City, Kans., assignors to Spencer Chemical Company, Kansas City, Mo., a corporation of Missouri
No Drawing. Filed Feb. 1, 1961, Ser. No. 86,296
8 Claims. (Cl. 260—340.7)

This invention relates to novel methods of producing pentaerythritol condensation compounds. More particularly, it relates to novel processes for preparing bis(hydroxyneopentylidene) pentaerythritol (also referred to in the art as $\beta,\beta,\beta',\beta'$-tetramethyl-2,4,8,10-tetraoxaspiro-(5, 5)-undecane-3,9-diethanol), represented by the following formula:

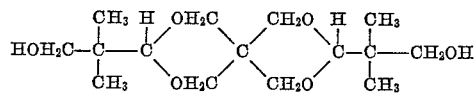

This diol is known in the prior art; for example, it is disclosed by John R. Caldwell and Benjamin S. Meeks, Jr., in U.S. Patent No. 2,945,008 to be useful in preparing certain linear polyester, polyurethane, and polycarbonate condensation polymers.

Previously, as described in the above reference, the diol was prepared by condensation of pentaerythritol and pentaldol (alternatively termed hydroxypivalaldehyde) employing an organic solvent as the reaction medium, from which water could be azeotropically removed. It was found following these known procedures that it was highly desired to maintain the reaction mixture as water-free as possible. Illustratively, in the above reference patent, it was thought that the preferred solvents were toluene and other volatile aromatic hydrocarbon solvents, which would permit the water of reaction to be removed easily by azeotropic distillation.

As is apparent, such employment of organic solvent in the preparation of the diol has certain inherent disadvantages. The reaction solvents are expensive and relatively unsafe to handle. The equipment required in the use of the organic solvents is comparatively expensive and inconvenient to use, particularly the mechanisms required for the removal of water of reaction.

An object of this invention is to provide novel methods of preparing bis(hydroxyneopentylidene) pentaerythritol employing an aqueous reaction medium. Other objects of this invention will be apparent from this disclosure.

Accordingly, provided by this invention is a surprisingly highly efficient method of preparing the bis(hydroxyneopentylidene) pentaerythritol diol by the condensation of pentaldol and pentaerythritol at an elevated reaction temperature employing an aqueous medium. Pentaldol and pentaerythritol reactants are added to water in required amounts in view of the fact that two mols of pentaldol (the usual commercial form is as its dimer) and one mol of pentaerythritol combine to form one mol of the diol. However, some excess of either reactant can be employed, especially the pentaldol reactant. Additionally, it has been found that for the most efficient formation of the diol, the higher concentrations of reactants in the aqueous medium are preferred. Illustratively speaking, on the basis that the theoretical ratios of the reactants and preferred reaction temperatures are employed to provide the diol, for best results from about 20 to about 35 grams on the basis of pentaldol per 100 ml. of the aqueous reaction medium are employed. At these higher concentrations of reactants, normally a highly pure diol product is formed during the preferred reaction periods, which product for use in polymer formation and other use will not ordinarily require further purification as by recrystallization. However, lower concentrations of the reactants or slightly higher concentrations of the reactants may be employed if desired for some reason.

The reaction can be carried on by following a batch or a continuous procedure. A particularly efficient and convenient reaction set-up is a modified batch procedure wherein the reaction mixture is continuously circulated for removal of formed product and by re-introduction thereof to the reaction vessel after removal of the formed product. It is desirable that the reaction mixture be stirred or agitated during the reaction.

The reaction is usually conducted at an elevated temperature of at least about 40° C. It has been found desired to conduct the reaction at a temperature in the range of about 50° C. to about 100° C. with a presently preferred reaction temperature being in the range of about 65° C. to about 85° C. It has been found that a highly efficient reaction providing optimal yields is customarily obtained when the reaction is conducted at about 75° C. The reaction is conducted at one of the above temperatures for a time sufficient to provide reasonable yields of the desired diol. It is apparent that the length of the reaction period will vary dependent upon the reaction temperature employed and the concentration of the reactants. Employing the preferred reaction temperatures, it has been found that about two to six hours is usually a sufficient reaction period, with about four to five hours presently deemed sufficient to provide a near optimum yield employing preferred conditions, for example, employing a reaction temperature of about 75° C. and a concentration of pentaldol of about 20 to 30 grams per 100 ml. of reaction medium, on the basis that the theoretical ratio of the reactants is employed.

In the reaction medium, a catalytic amount of a condensation catalyst is incorporated to promote the formation of the desired diol from the reactants. Common catalysts which have been found functional in the art as condensation catalysts, such as sulfonic acids, for example, p-toluenesulfonic acid, can be used. Enough of the acid catalyst should be employed to acidify the reaction mixture. About 0.1 to about 2 grams of p-toluenesulfonic acid per 100 ml. of reaction solvent has been found to provide a satisfactory catalytic effect.

The provided diol precipitates from the reaction mixture and, thus, can be recovered from the reaction mixture simply by following conventional filtration, decantation, or centrifugation procedures. If necessary or desired, the separation of the diol from the aqueous reaction medium can be augmented as by removal of part of the medium by evaporation. The separated crystalline product is normally highly pure, particularly if the preferred temperatures and concentrations of reactants are employed in its preparation, and thus, as previously noted herein, for most requirements will not require recrystallization. However, if concentrations of reactants approaching saturation of the aqueous medium are employed, the products of diol often do not attain the high degree of purity obtainable using the preferred concentrations. If it is desired to recrystallize the product, recrystallizing solvents such as a lower alkanol (e.g., isopropanol), lower alkanol-water mixtures, acetone, or toluene, can be employed. The produced diol can be washed and dried if desired prior to use.

The following illustrative examples are in further explanation of the invention but are not in limitation thereof:

EXAMPLE I

*Preparation of Bis(hydroxyneopentylidene) Pentaerythritol*

To 500 ml. of water are added 136 grams (1.34 mols)

of pentaldol as its dimer (representing 27.2 g./100 ml. of medium), and 91 grams (0.67 mol) of pentaerythritol, and 1.0 gram of p-toluenesulfonic acid hydrate as catalyst. The reaction mixture is heated and maintained at about 73° C. for 4.5 hours. The desired product which crystallizes out is removed by filtration, is washed one time with water, and is dried in vacuo. The product consisting of bis(hydroxyneopentylidene) pentaerythritol is a white, highly pure crystalline product having a melting point of 202–203° (as determined using a Fisher-Johns melting point apparatus). Yield: 70%. Elemental analysis—Calculated: C, 59.29%, H, 9.27%. Found: C, 59.47%, H, 9.25%.

An infrared absorption analysis using a mineral oil mull confirms the formation of the desired compound. When the product as obtained directly from the process is recrystallized from isopropanol, the melting point is substantially unchanged, demonstrating the initial high purity.

EXAMPLE II

Successively repeating the procedure of Example I using reaction temperatures of 53° C. and 90° C., the yields obtained were 40 percent and 43 percent of theoretical yields, respectively.

EXAMPLE III

Repeating the procedure of Example I with the exception that 13.6 g. of pentaldol/100 ml. of reaction medium was employed and the pentaerythritol concentration was proportionally reduced, the yield obtained was 6.8 g. (34 percent of theory).

EXAMPLE IV

Repeating the procedure of Example I with the exception that 36.2 g. of pentaldol/100 ml. of reaction medium was employed and the pentaerythritol concentration was proportionally increased, the yield obtained was 49.1 g. (78 percent of theory). This product was recrystallized from an isopropanol-water mixture (70:30 parts by weight) to provide bis(hydroxyneopentylidene) pentaerythritol having about the purity of the product of Example I.

What is claimed is:

1. A method of preparing bis(hydroxyneopentylidene) pentaerythritol by the condensation of pentaldol and pentaerythritol at an elevated reaction temperature employing an aqueous reaction medium.

2. The process according to claim 1 wherein the reaction temperature employed is in the range of about 50° C. to about 100° C.

3. The process according to claim 1 wherein the reaction temperature employed is in the range of about 65° C. to about 85° C.

4. The process according to claim 1 wherein the reaction temperature employed is about 75° C.

5. The process according to claim 1 wherein the reaction temperature employed is in the range of about 65° C. to about 85° C. and the reaction medium contains a catalyzing amount of a sulfonic acid condensation catalyst.

6. The process according to claim 1 wherein, on the basis the theoretical ratio of reactants is employed, the pentaldol concentration is from about 20 to about 35 g. per 100 ml. of the reaction medium.

7. The process according to claim 1 wherein, on the basis the theoretical ratio of reactants is employed, the pentaldol concentration is from about 20 to about 35 grams per 100 ml. of the reaction medium, and the reaction temperature employed is in the range of about 65° C. to about 85° C.

8. The process according to claim 1 wherein, on the basis the theoretical ratio of reactants is employed, the pentaldol concentration is from about 20 to about 35 g. per 100 ml. of the reaction medium, and wherein the formed bis(hydroxyneopentylidene) pentaerythritol is recovered.

References Cited in the file of this patent
UNITED STATES PATENTS 2,945,008    Caldwell et al.  _____ July 12, 1960